United States Patent [19]
Sturman et al.

[11] 3,989,066
[45] Nov. 2, 1976

[54] FLUID CONTROL SYSTEM

[75] Inventors: Oded E. Sturman; Benjamin Grill; Yigal Froman, all of Northridge, Calif.

[73] Assignee: Clifton J. Burwell by said Oded E. Sturman and said Benjamin Grill, Northridge, Calif. ; a part interest

[22] Filed: May 20, 1974

[21] Appl. No.: 471,671

Related U.S. Application Data

[62] Division of Ser. No. 213,997, Dec. 30, 1971, Pat. No. 3,821,967.

[52] U.S. Cl. .............................. 137/624.2; 239/66
[51] Int. Cl.[2] ........................................ A01G 25/16
[58] Field of Search ....... 137/624.2, 624.18, 624.19; 239/66, 67, 69, 70

[56] References Cited
UNITED STATES PATENTS

| | | | |
|---|---|---|---|
| 2,619,105 | 11/1952 | Hauser | 137/624.2 X |
| 3,234,410 | 2/1966 | Sherman | 137/624.2 X |
| 3,286,733 | 11/1966 | Hunter | 137/624.2 |
| 3,332,443 | 7/1967 | Mize | 137/624.2 X |
| 3,410,301 | 11/1968 | Merriner et al. | 251/30 X |
| 3,440,434 | 4/1969 | Yates et al. | 137/624.2 X |
| 3,444,896 | 5/1969 | Van Der Veer | 137/624.2 |
| 3,524,471 | 8/1970 | Bresser | 137/624.2 X |
| 3,547,154 | 12/1970 | Benham | 137/624.11 |
| 3,683,239 | 8/1972 | Sturman | 335/170 X |
| 3,747,620 | 7/1973 | Kah | 137/624.2 X |
| 3,827,459 | 8/1974 | Hunter | 137/624.2 X |
| R27,041 | 1/1971 | Hotchkin | 137/624.2 |

*Primary Examiner*—Alan Cohan
*Assistant Examiner*—Gerald A. Michalsky
*Attorney, Agent, or Firm*—Blakely, Sokoloff, Taylor & Zafman

[57] ABSTRACT

A battery operated fluid control system, which may be used in a sprinkler system having a master valve unit with a battery operated electronic clock therein for periodically opening the valve for a preset duration in response to the clock turn-on pulse, and being operable with one or more slave valve units connected in series to sequentially open the slave valves for their corresponding preset time duration. The clock is comprised of an oscillator having a plurality of countdown flip-flops, with the clock turn-on pulse being selectable from the outputs of a group of the lower flip-flops to give a selection of valve turn-on intervals. A battery operated solenoid valve of the latching type and associated circuitry is located in the master valve unit and each of the slave valve units, with the circuitry being adapted to receive a pulse, either from the clock or from the turn-off signal of the previous valve unit, and to provide a turn-on pulse to the solenoid. The circuitry is also comprised of an adjustable time delay circuit to measure the desired duration from the turn-on pulse and to provide a subsequent turn-off pulse to the solenoid. One embodiment is adapted to replace the valve mechanism in a prior art anti-syphon valve assembly. Another embodiment incorporates a unique anti-syphon valve which does not obstruct the primary flow path and further has a moisture collecting container on the side thereof, cooperatively disposed with the anti-syphon valve and having electrical probes therein connected to the circuitry. When the valve turns on, the initial leakage of the anti-syphon valve fills the container, which will remain filled in rainy or very himid weather, thereby preventing subsequent opening of the valve until the moisture has evaporated. The valve and time delay circuit is also adaptable for use in manually initiated systems, such as toilets and the like, and a unique toilet bowl and water valve component arrangement is disclosed to achieve the anti-syphon function.

5 Claims, 16 Drawing Figures

FLUID CONTROL SYSTEM

This is a division of application Ser. No 213,997 filed Dec. 30, 1971, now U.S. Pat. No. 3,821,967.

BACKGROUND OF THE INVENTION

1. Field of the Invention.

The present invention relates to the field of fluid control systems such as sprinkler systems for watering and irrigation purposes and valves for use in toilets and the like.

2. Prior Art.

Fluid control systems are widely used for a variety of purposes. Some of these systems simply comprise a set of valves which are manually opened and manually closed. Other systems comprise one or more valves which are manually opened and automatically closed a short time thereafter, such as in toilets, and still others comprise a complete system for periodically opening one or more valves for a predetermined length of time, such as are used in automatic lawn watering systems. Inasmuch as the preferred embodiments of the present invention disclosed herein are specifically adapted for use in fully automatic watering systems and in toilets, the prior art in these two types of water control systems will be discussed, it being recognized and obvious from the disclosure herein that the present invention is in no way limited, only to these two applications.

Automatic sprinkler systems for automatically watering lawns, fields and the like are well-known in the prior art. These systems are generally adapted to open one or more valves at predetermined intervals for predetermined durations, as controlled by one or more clocks, so as to direct water to the various sprinklers as desired.

The most common of the prior art systems are designed to operate on a standard 115 volt 60 cycle power source. A central clock is used for timing to control the distribution of power to the various solenoid valves for opening the valves in the various water lines. Typically, the solenoid valves are designed for automatic closing, and to be opened and to remain open only during the duration of a low voltage power supply thereto. For such purposes, the 115 volt 60 cycle power is transformed through a step-down transformer to a lower voltage so as to be more readily and safely dispatched to the various solenoid valves through underground conduits.

The above described systems are by far the most common systems in use, particularly in residential installations. However, these systems have a number of problems associated therewith which prevent their more widespread use. Though such systems are expensive, their cost is generally not considered prohibitive. However, the purchase of a system is but one part of the expense associated with the use of the system. The installation, say in a residence, requires wiring the system into the house power lines and running underground wires from the central clock to each of the solenoid valves, as well as placement of the solenoid valves in the respective water lines. In new housing developments, the cost of installing such a system before driveways, patios and the like are put in may well be more than the purchase price of the system, and in older residences may be prohibitive because of the presence of patios, driveways, swimming pools and the like, and further, the reluctance of the homeowner to have his landscaping disturbed. Consequently, while such systems meet the basic objective of periodically watering an area, the total cost associated with such systems and the inconvenience and difficulty of installing such systems has prevented the more widespread use thereof.

Battery-operated sprinkler systems are also known in the prior art. By way of example, a battery-operated system is disclosed in U.S. Pat. No. 3,547,154 entitled "Irrigation Timing Control Apparatus." That system uses a battery to operate a motor driven timer which periodically rotates a permanent magnet on a timer disc into proximity with a magnetically actuated reed switch which turns on a solenoid valve and a time-delay network, which in turn, turns off the solenoid valve after the desired time. The solenoid valve used with this system is of a magnetically latching type, turning on with a pulse in the first direction and turning off with the pulse in the second direction. However, in the system described in that patent, no means of reversing the direction of the current pulse of the solenoid coil is disclosed, but instead a center tapped coil is used, with the on pulse being applied to one end of the coil with respect to the center tap, and the off pulse being applied to the other end of the coil with respect to the center tap. Consequently, only one-half of the solenoid coil is usable for either turning on or turning off the valve, thereby detracting from the efficiency and force, or adding to the cost and size of the device.

In the above described battery-operated system, no means is disclosed whereby a single clock may be used to sequentially operate the series of slave valves. Upon closure of the reed switch, a capacitor starts to charge, and upon reaching a particular voltage, is discharged through one-half of the solenoid coil to turn on the valve. Consequently, the reed switch must remain closed for a sufficient length of time for the capacitor to be charged through various current limiting resistors. Thus, the system is not responsive to a pulse control signal, and a turn off signal somehow derived from one unit would in no way be operative to turn on the next unit. Thus, in the system disclosed, each valve has associated therewith a timer and full circuitry for operation of the system. The timer itself is a motor actuated device, thereby being relatively expensive, having a limited life and requiring a very significant, continuous power for proper operation.

Also known in the prior art are moisture sensors for use in sprinkling systems to control the application of water based on the particular needs of the soil. Some of these moisture sensors are designed as probes to be inserted in the soil and electrically connected to the sprinkler system so as to sense the moisture content in the soil. Such moisture sensors are disclosed in U.S. Pat. No. 3,113,724, entitled "Automatic Watering Systems" and U.S. Pat. No. 2,578,981, entitled "Electronically Operated Soil Sprinkling or Irrigating Systems". Such systems are useful to prevent the operation of the sprinkler system when the ground already contains adequate moisture because of rain or high humidity occurring or prevailing since the last sprinkling. However, sensors placed in the ground must be placed at a position which is representative of the total area being watered and must be wired into the sprinkler system. The sensor and the wires connecting it to the sprinkler system are generally easily damaged by lawn mowers and the like, and since the sensor is adapted to measure the conductivity of the soil, and particularly to sense the high conductivity of the soil for moisture, a broken lead to the sensor will provide a signal equivalent to dry soil, thereby allowing operation of the system when the soil already contains adequate moisture.

Another type of moisture sensor is shown in U.S. Pat. No. 3,339,842 entitled "Systems for Water Control". This type of sensor is conected into the water line downstream of the solenoid valve so as to collect a portion of the delivered water in an open container while the valve is open. The apparatus is arranged so that a subsequent opening of the solenoid valve will be prevented until at least a predetermined amount of water in the container has evaporated. Thus, rainy weather and/or humid weather will reduce the frequency of operation of the system as desired. However, the apparatus disclosed therein is separate and apart from the solenoid valve and is adapted to operate in conjunction with motors, relays and the like and therefore, is not suitable for battery operation because of the relative amount of power required.

The prior art systems are generally comprised of an assembly of old and standard components to achieve the desired purpose. By way of example, none of the prior art systems have anti-syphon valves incorporated as part of the solenoid valve, or integral with any other component of the system, though such valves are commonly required as part of such systems in many instances. Furthermore, prior art anti-syphon valves, as a separate component, have the anti-syphon valve element directly in the flow stream movable from a position blocking the reverse water flow and venting the sprinkler system to the air, to a position of allowing forward water flow and sealing the air vent. These valves perform the function of preventing substantial back-flow of water from the sprinkler system back into the public water system upon loss of pressure in the public water system by obstructing the water line against reverse flow and venting the sprinkler side of the line to remove the water from that point. To accomplish this, the anti-syphon valves are deliberately placed at a level substantially higher than the highest sprinkler head so that the venting of the system at that point will prevent syphoning of the system into the public water supply. However, it has been found recently that micro organisms, once entering a water line, are able to pass through a closed valve which contains water on both sides of the valve. Consequently, to prevent this, one side of the valve, namely the low-pressure side, should be vented to the air so that the various surfaces may quickly dry and thereafter not present a water pool for collection and multiplication of such micro organisms. Prior art anti-syphon valves do not achieve this latter purpose, inasmuch as the anti-syphon portion is somewhat removed from the on-off valve. When the on-off valve is turned off, the water flow stops and the anti-syphon valve element effectively sinks in the water in the anti-syphon valve to a closed-position so as to prevent substantial backflow. Since the anti-syphon valve element closes merely by the force of gravity, and in general is closing on a less than perfect valve seat, the anti-syphon valve closing may be better described as presenting an obstruction to back-flow as opposed to a seal against backflow. Consequently, micro organisms may freely collect and multiply in the water between the anti-syphon valve and the on-off valve, and will be invited to collect in this region by the water trapped above the anti-syphon valve element and the freedom with which such organisms may travle therefrom through the anti-syphon valve. Thus, it may be seen that though prior art anti-syphon valves prevent gross reverse flows from loss of water pressure in the public water supply, such valves do not prevent the accumulation and distribution of micro organisms in the water system in every day use.

It may thus be seen that prior art battery-operated sprinkler systems are complex systems having a short battery life or requiring very large batteries, and require an individual timer for each valve in the system. Such systems do not incorporate moisture-sensing devices and are not capable of sequential operation from a single clock located at one of the valves. Anti-syphon vlaves used with such systems are separate valves having a considerable expense associated therewith and not being adapted to prevent the flow of micro organisms into the public water supply. There is, therefore, a need for a simple, reliable and inexpensive battery-operated sprinkler system which may be readily installed within a new or existing sprinkler system without substantial wiring, and which may give sequential operation of a plurality of sprinkler valves from a single clock disposed in one of the vlave units.

Prior art toilets generally fall within two categories, these two categories being toilets for residential use and toilets for use in public or semi-public buildings, with this latter category being further subdividable into toilets where the flushing is manually initiated and toilets which are automatically periodically flushed.

In toilets intended for residential use, a typical installation will comprise a porcelain receptable connected to a drain and partially filled with water, with a seat assembly disposed thereabove and a water reservoir or tank generally adapted for mounting to a wall immediately behind the porcelain receptacle so as to be operable to discharge water contained therein into the receptacle. A float assembly and float actuated valve is located in the tank so as to control the water level in the tank and to refill the tank after it has been discharged into the receptacle. A second float is disposed over a discharge opening in the bottom of the tank so that once it is displaced therefrom, it will float away from the discharge opening until the tank is substantially emptied of water. In this assembly, the purpose of the tank is twofold. First, it provides a reservoir for a predetermined amount of water and may provide an instantaneous water flow rate unobtainable through the water supply line connected to the toilet. Secondly, it functions, at least indirectly, as a time delay mechanism for turning off the water supply line when a predetermined amount of water has been allowed to flow into the tank. However, it has been found that water flow rates obtainable directly from the water supply lines in an ordinary home are fully adequate for proper flushing action and therefore, the single essential reason for the tank and mechanical assembly associated therewith is to provide a convenient time delay shut-off means for the water supply.

The disadvantages of the prior art residential toilet installation are primarily threefold. First, the cost associated with the tank and the various floats, mechanical linkages, etc., is substantial, both in initial purchase cost and in cost of installation. Secondly, such installations require a reasonable amount of maintenance, such as required periodic replacement of valve seats, floats, etc. Thirdly, the tank itself is physically fairly large and not easily packaged so as to be an attractive and aesthetically appealing article in the bathroom, thus making the toilet a generally dominating and unattractive feature of the room.

In commercial installation of the type which are manually flushed, it is common practice to eliminate the tank and to connect the remainder of the toilet directly to the water supply line through a mechanical time delay valve. These valves are adapted to open and to later automatically close in a manner actuated by and responsive to the water flow therethrough. Such valves are relatively complicated mechanical assemblies having an open duration which may not be adjustable, and requiring fabrication from brass and other expensive materials exhibiting suitable non-corrosive and durable characteristics. In other commercial installations where periodic flushing is achieved automatically, it is common to place a solenoid actuated valve in the water line and to operate the valve from an electromechanical timer, similar to the prior art sprinkler systems hereinabove described. Thus, it may be seen that in these prior art systems, there is considerable opportunity for cost and maintenance reduction, and particularly in residential installations for reducing the size and improving the appearance of the installations while simultaneously achieving the other heretofore-described desirable objects.

BRIEF DESCRIPTION OF THE INVENTION

The present invention is a fluid control system adapted for manual or electronic initiation of the system followed by the automatic shutting off of the system after a predetermined lapse of time. One embodiment comprises a battery operated water control system, which may be used in a sprinkler system having a master valve unit with a battery operated electronic clock therein for periodically opening the valve for a preset duration in response to clock turn-on pulse, and being operable with one or more slave valve units connected in series to sequentially open the slave valves for their corresponding preset time duration. The clock is comprised of an oscillator having a plurality of countdown flip-flops, with the clock turn-on pulse being selectable from the outputs of a group of the lower flip-flops to give a selection of valve turn-on intervals. A battery operated solenoid valve of the latching type and associated circuitry is located in the master valve unit and each of the slave valve units, with the circuitry being adapted to receive a pulse, either from the clock or from the turn-off signal of the previous valve unit, and to provide a turn-on pulse to the solenoid. The circuitry is also comprised of an adjustable time delay circuit to measure the desired duration from the on pulse and to provide a subsequent off pulse to the solenoid. One embodiment is adapted to replace the valve mechanism in a prior art anti-siphon valve assembly. Another embodiment incorporates a unique anti-siphon valve which does not obstruct the primary flow path and further has a moisture collecting container on the side thereof, cooperatively disposed with the anti-siphon valve and having electrical probes therein connected to the circuitry. When the valve turns on, the initial leakage of the anti-siphon valve fills the container, which will remain filled in rainy or very humid weather, thereby preventing subsequent opening of the valve until the moisture has evaporated.

The valve and time delay circuit is also adaptable to other embodiments, such as, by way of example, embodiments for use in manually initiated systems such as toilets and the like. A unique toilet bowl and water valve component arrangement is disclosed whereby a toilet may be flushed directly by the manual initiation of the valve followed by the automatic closure of the valve after a pre-determined flushing time. A valve closure assembly is slidably disposed on a valve actuating member so that the valve may quickly and readily close upon the loss of pressure in the high pressure line so as to prevent the backflow of water into the water supply line. the toilet bowl is provided with a plurality of holes through the bowl adjacent the top thereof to limit the level of water therein, in the event of sewer stoppage, so that water may drain out of the flushing water supply area to provide air behind the closed valve. An alternate embodiment discloses an alternate form of anti-siphon valve which provides for the positive venting of the low pressure side of the valve upon loss of pressure on the high pressure side of the valve, and in either configuration, the valve need only be located a matter of an inch or two above the maximum water level in the toilet bowl to provide adequate anti-siphon valve operation.

Figures 1, 2:
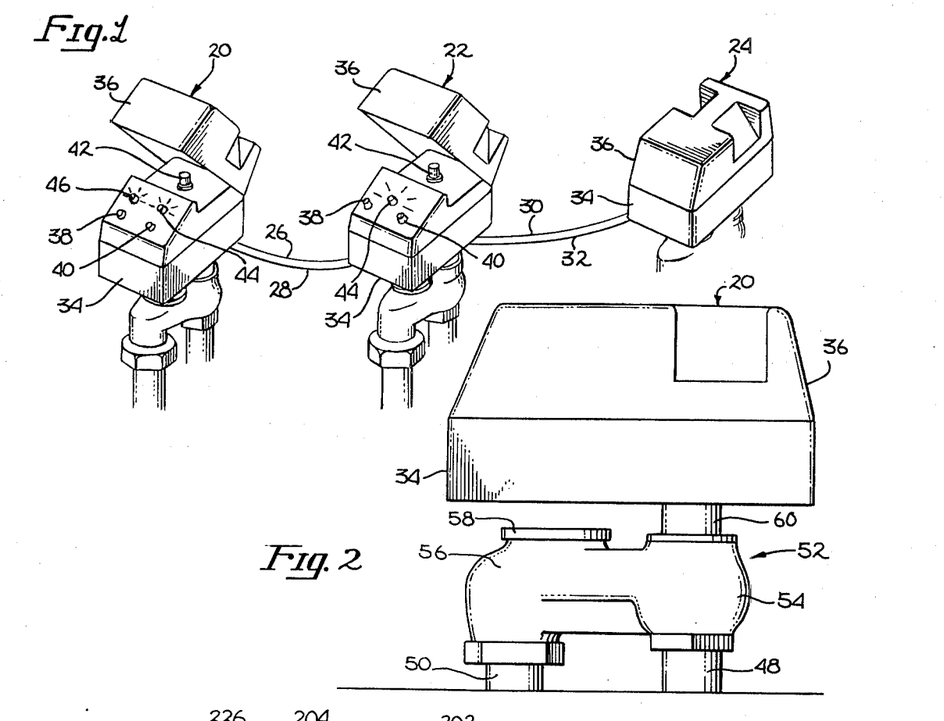
FIG. 1 is a prospective view of the water control system of the present invention as adapted for use in a sprinkler system.
FIG. 2 is a side view of the master controller of the embodiment of FIG. 1.

First referring to FIG. 1, a prospective view of the present invention water control system as it is used for a sprinkler system may be seen. The specific water control system shown is comprised of a master controller 20 and a pair of slave controllers 22, with the master controller 20 electrically coupled to slave controller 22 through wires 26 and 28, and slave controllers 22 and 24 coupled together through wires 30 and 32. Further, the specific system shown in adapted to replace the manually operated portion of a standard anti-siphon valve, commonly used in such states as California, so as to provide for automatic operation of the valve unit while maintaining the anti-siphon characteristic of the remainder of the prior art anti-siphon valve.

Both the master controller and the slave controllers have an enclosure 34 enclosing the mechanism and circuitry of the controllers, with a cover 36 rotatably engaging the back of enclosure 34 and adapted to cover various controls located on the top of the enclosure. In particular, accessible in each of the controllers is a button 38 for manually opening the valve of that controller, and a pushbutton 40 for turning off the valve of that controller. Also, each controller has a rotatable adjustment 42 also accessible under cover 36 for adjusting the maximum flow rate for the valve of the respective controller, and a potentiometer adjustment 44 for adjusting the duration for which the valve of the respective controllers will remain open before automatically turning off. In the master controller, there is also located an interval selector 46 for allowing manual selection of the time interval between valve operations.

Now referring to FIG. 2, a side view of one of the controllers of FIG. 1, specifically controller 20, and the prior art anti-siphon valve body on which it is mounted may be seen. Prior art anti-siphon valves of this type are adapted to connect to and inlet line 48 coupled directly or indirectly to the main water supply line, and an outlet line 50 connected to one or more sprinklers. The anti-siphon valve body 52 normally has a conventional valve member generally located within the region 54, with an operating member projecting upward so as to be operable in rotation much like an ordinary faucet, and an anti-siphon portion or valve breaker generally located within region 56 of the anti-siphon valve body 52 under vent cap 58. However, when the present invention system is used, the valve unit is removed from the anti-siphon body and member 60 of either a master controller or a slave controller is threaded into the threaded cavity in the valve body 52 so as to convert the anti-siphon valve to an automatically operating valve, as shall be subsequently described in greater detail.

Figures 4, 7:
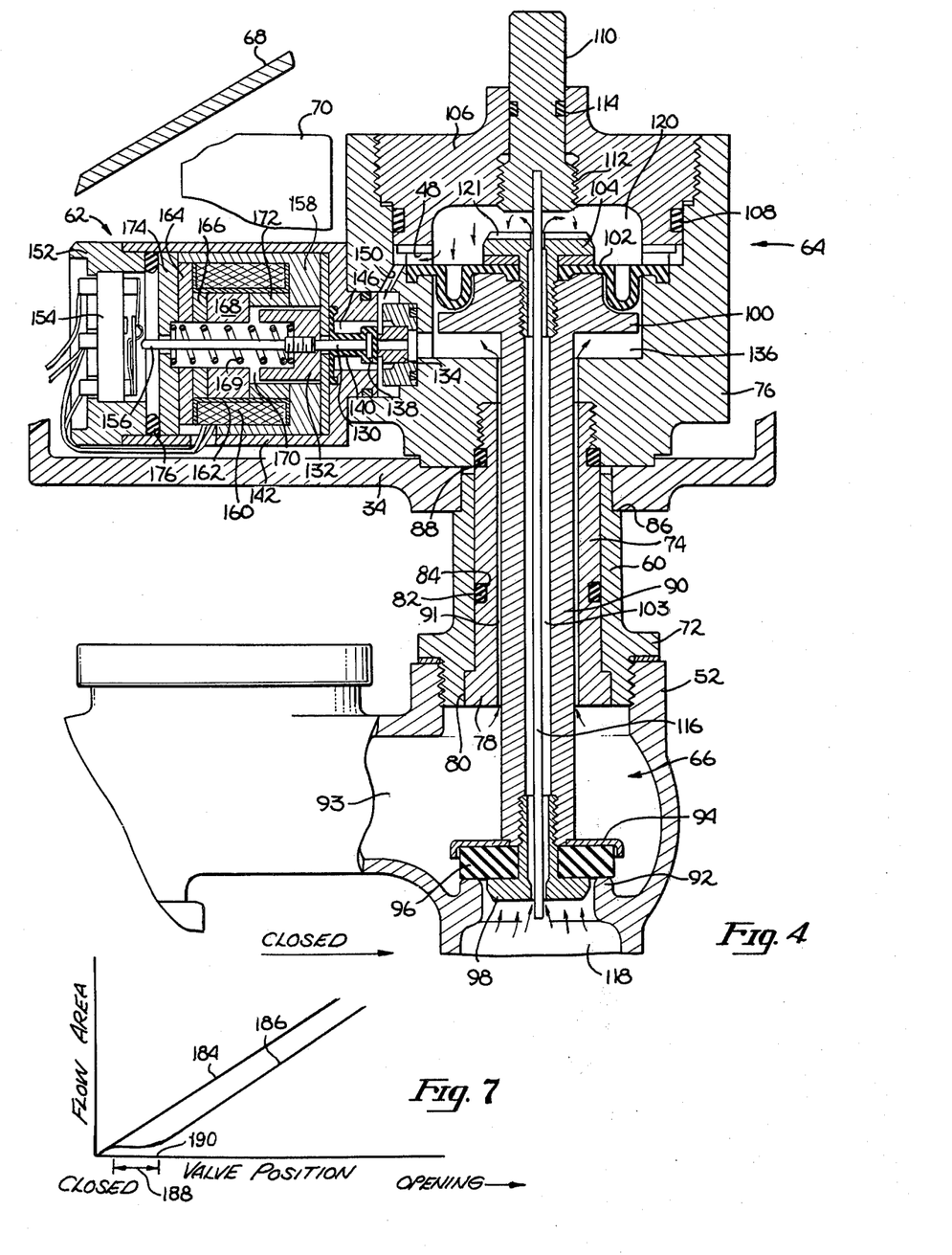
FIG. 4 is a partial cross-sectional view of the master controller of FIG. 2 with the valve in the closed position.
FIG. 7 is a graphical representation of the flow area versus valve position for the valve shown in cross-section of FIGS. 4 through 6.

Now referring to FIG. 4, a cross-section of the master controller 20 of FIG. 1 may be seen. Within enclosure 34 is a solenoid, generally indicated by the numeral 62 for actuating a hydraulic (pressure responsive) control valve, a hydraulic (pressure responsive) actuator within the main body portion, generally indicated by the numeral 64, a valve closing member generally indicated by the numeral 66 actuated by the pneumatic actuator, an electronic circuit board 68, and an electronic clock module 70.

Member 60 threadably engages the top of the anti-siphon valve body 52, with shoulder 72 engaging the top surface of the anti-siphon valve body. An inner member 74 threadably engages body 76 and is retained within member 60 by an integral shoulder 78 on the lower end thereof engaging recess 80 in the lower end of member 60. An O-ring 82 is disposed in an O ring groove 84 in the inner member 74 for preventing water leakage between inner-member 74 and member 60. The upper end of member 60 has an area of reduced diameter defining a shoulder 86 which engages the edges of cooperatively disposed hole in enclosure 34 to retain the enclosure between member 60 and body 76. An O-ring 88 is disposed in an O-ring groove adjacent to the upper end of the inner-member 74 so as to prevent water leakage between the inner-member and body 76.

The valve actuating member 70 is disposed within inner-member 74 with sufficient clearance to allow a small amount of water flow therebetween, in annular passageway 91 generally restricted in amount by the viscosity of the water in the large surface area of the annular space. The actuator member 90 extends downward to a position substantially concentric to and slightly above valve seat 92 in the anti-siphon valve body 52. A seating surface support member 94 is disposed on the lower end of the actuator member 90 and a somewhat compliant member 96 of hard rubber is retained therebelow by a screw 98 threadedly engaging the inner-diameter of valve member 90.

The upper end of valve member 90 has a flange 100 contoured to engage and partially support an impervious and compliant diaphragm 102 which is retained adjacent its inner-diameter to the valve member 90 by a screw 104 threadedly engaging the inner surface of valve member 90.

Located above valve member 90 and threadedly engaging body 76 is a cap 106 sealed with respect to body 76 by O-ring 108, and supporting at its inner surface a valve opening adjustment member 110 by the cooperatively disposed threads 112, with O ring 114 disposed between member 110 and cap 106 preventing leakage of water therebetween and providing a yieldable restraint in the rotatability of the valve opening adjustment member. Screw 98 and screw 104 have a hole therethrough concentric therewith, and valve member 90 has a cylindrical opening running therethrough (threaded at each end to receive screws 98 and 104 as heretofore indicated). A rod 116 is supported by valve opening adjustment member 110 and projects downward through screws 104 and 98 so as to partially close off the hole area therethrough, thus defining an annular passageway 103 communicating with the water in the water supply line, generally indicated by the numeral 118, and the cavity above diaphragm 102, generally indicated by the numeral 120. (The annular passageway is not readily plugged by foreign matter, and relative motion between rod 116 and the moving assembly provides a self cleaning action.)

A solenoid 62 is mounted on the side of body 76, with a member 130 connected to plunger 132 thereof extending concentrically with a valve seat defined by the member 134 communicating with cavity 136 on the lower side of diaphragm 102. The extension 130 has an enlarged head 138 with a molded rubber seal member 140 disposed thereover so as to engage the valve seat member 134 when the solenoid plunger is extended. Rubber member 140 is retained between solenoid housing 142 and member 144 so as to provide an effective seal between the various cavities normally filled with water and the internal mechanism of the solenoid. Cavity 120, located above diaphragm 102, communicates with a cavity 146 surrounding rubber member 140 through a porous member 48 between cap 106 and diaphragm 102 and a passageway 150 communicating with cavity 146.

The solenoid 62 is of the latching type, a suitable solenoid being that disclosed in a co-pending application entitled "Self-Latching Solenoid Actuator," Ser. No. 153,939, now U.S. Pat. No. 3,683,239, by Oded E.

Sturman, and assigned to the assignee of the present invention. That particular solenoid, as shown in FIG. 4, has a plastic case 142 and plastic cap 152 with a single-pole double-throw switch 154 of the type commonly referred to as a microswitch, located therein, with an actuating member disposed so as to be engagable by extension 156 connected to plunger 132. The magnetic circuit is comprised of a soft iron member 158 having an inner-diameter forming a loose slip fit with the outer-diameter of plunger 132, and extending around solenoid coil 160 wound on bobbin 162 so as to be in close magnetic communication with a soft iron cap member 164. A permanent magnet 166, generally selected from the alnico group of magnet materials, is mounted within bobbin 162 and adjacent body cap 164, with a soft iron member 168 in close magnetic communication with the permanent magnet 166 and projecting toward plunger 132 so as to define an air gap 170 therebetween when the plunger is in the extended position. A non-magnetic spacer 172 aids in the retention of the various components of a solenoid in the desired position and a coil spring 169 urges plunger 132 to the extended position. A further non-magnetic member 174 in cooperation with cap 152 and O-ring 176 completes the assembly and provides both a seal against the infusion of moisture and a yieldable force on the various components of the solenoid so as to further aid in the retention of those components in the desired position.

With the solenoid plunger in the extended position as shown in FIG. 4, a communication between cavities 120 and 136 on opposite sides of diaphragm 102 is prevented. In this condition, the pressure of the water on the high pressure side of the valve, that is, in region 118, is communicated through annular passage 103 to cavity 120 above the diaphragm, while cavity 136 below the diaphragm is in communication through the annular passage 91 with the low pressure side of the valve, generally indicated by the numeral 93. Since the area of the diaphragm (and of the flange 100) is considerably larger than the area of the valve seat 92, and the differential pressure across the diaphragm is equal to the differential pressure on the lower end of the valve actuating member, the pressure above the diaphragm forces the valve member 90 downward so as to firmly engage member 96 with valve seat 92.

Figures 5, 6:
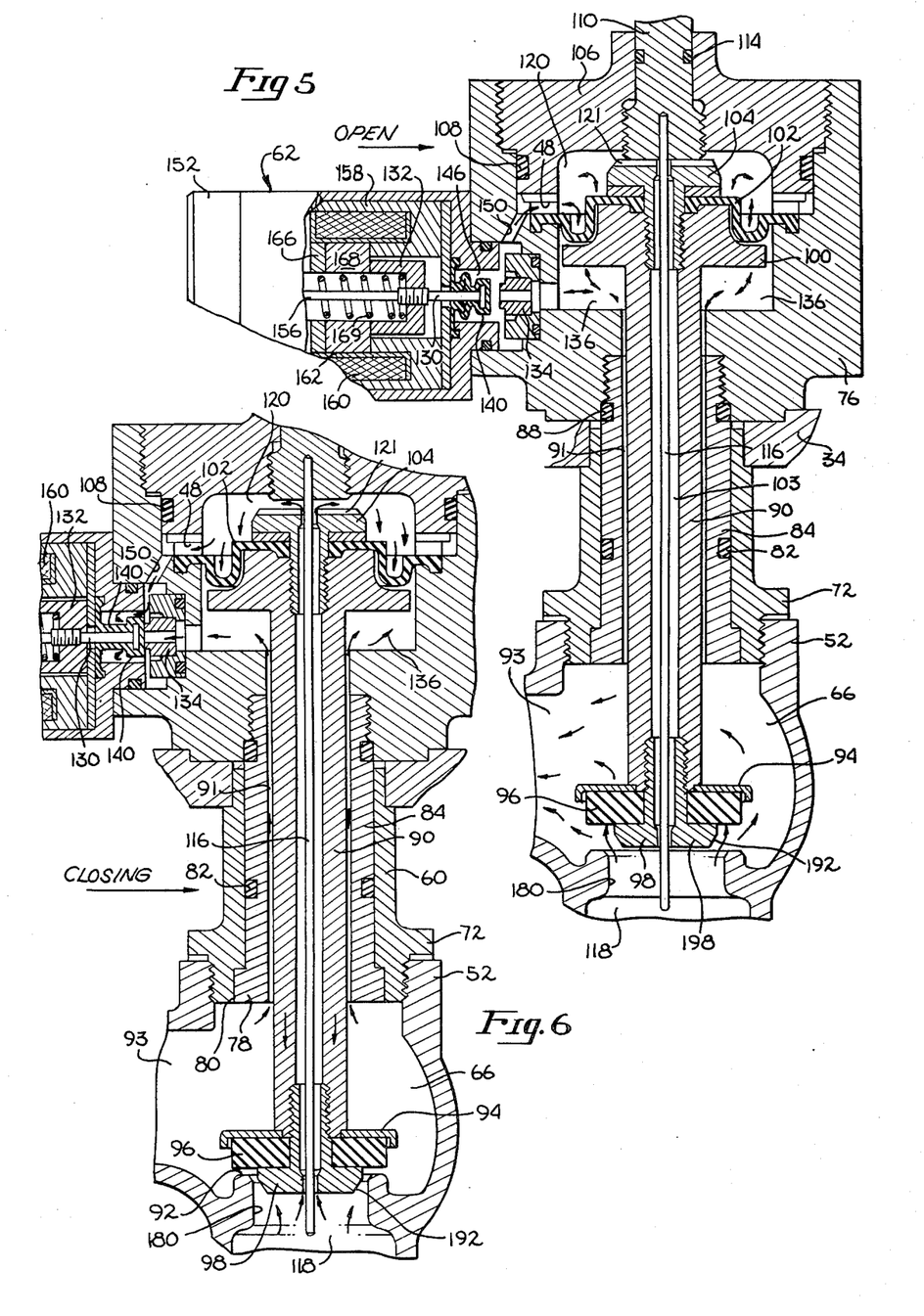
FIG. 5 is the cross-section of the valve of FIG. 4 showing the valve in the open position.
FIG. 6 is the cross-section of the valve of FIG. 4 showing the valve as it is moving from the open position to the closed position.

Now referring to FIG. 5, the cross-section of the valve similar to that shown in FIG. 4 is presented, but with the valve in the open position. When solenoid 62 is pulsed, in a manner to be hereinafter described in greater detail, the solenoid plunger 132 moves to the withdrawn position, as shown in FIG. 5. Thus, rubber member 140 is withdrawn from engagement with the valve seat in member 134, and cavity 136 is thereafter in communication through cavity 146 to cavity 120. This tends to equalize the pressure on both sides of diaphragm 102, provided the annular passage ways 91 and 103, or at least one of them, is sufficiently small to limit the flow therein so as to allow substantial equalization of the pressures on both sides of the diaphragm through the various flow passages then providing a means of communication between the two sides of the diaphragm. In this regard, it will be noted that a screwdriver-like slot 121 is located at the top of screw 104 so that communication between passageway 103 and cavity 120 will not be prevented by the engagement of the top screw 104 with adjustment member 110. It may be seen also that the adjustment member 110 engages the top of screw 104 and may be rotated on its screw threads to provide an adjustment for the extent of opening of the valve, thereby controlling the flow rate therethrough in the open position. (Rod 116 is used to limit the flow area in the annular passageway 103, particularly adjacent to the ends thereof and is used instead of merely utilizing smaller holes in screws 104 and 98 since molding very small holes is difficult and the rod provides a very easy and convenient means for cleaning the holes, should such cleaning be required.)

When the solenoid plunger 132 again moves to the extended position, rubber member 140 again engages the valve seat in member 134 interrupting the communication between cavities 120 and 136. Thus, the pressure is cavity 136 approaches the low pressure in area 93 by communication therewith through the annular passage 91, while the pressure in cavity 120 approaches the higher pressure by communication with area 118 through annular passage 103. Consequently, as first described hereabove, the pressure on the top of diaphragm 102 is sufficient to cause downward movement of the valve member 90 so as to close the valve, the rate of downward movement of the valve member being limited by the rate of water flow out of the cavity 136 below the diaphragm and into cavity 120 above the diaphragm.

It should be noted that in the above-described valve, the rate at which the valve closes is dependent upon the pressure difference between the high pressure side of the valve and the low pressure side of the valve, that is, regions 118 and 93. Also, it is to be recognized that flowing water has considerable momentum so that if the flow of water in a pipe is suddenly stopped by the sudden closure of a valve, a shock wave will be transmitted throughout the water system putting considerable stress on the pipe, joints, valves, etc., and creating a distracting audible noise, commonly referred to as a water hammer. Since sprinkler systems are connected directly or indirectly to the same water supply as is used in the home, the water hammer created by the sudden closure of a sprinkler system valve may create an audible and distracting sound within the home. Such water hammers are commonly encountered with solenoid valves used on dishwashers, clothes washers and the like, and often transmit a noise to the plumbing system which may be heard in all rooms of a home. In the present invention system, a means is provided for substantially eliminating the water hammer in an extremely simple, yet high effective manner. In particular, it will be noted in FIG. 6, as well as FIGS. 4 and 5, that the head of screw 98 has a diameter which is a substantial fraction of the diameter of the bore 180 of valve seat 92, and further has a significant axial length, the design and proportioning of the screw being readily selectable by one skilled in the art for any particular valve design based on the following considerations: When the valve is open as shown in FIG. 5, the head of screw 98 is withdrawn from bore 180 and thus a substantial annular passageway is defined between the valve seat screw 98 and member 96, allowing substantial flow of water therethrough without excessive pressure drop. As the valve closes, the flow area decreases, and thus water pressure in area 118 increases because of the momentum of the water in the supply line and the decreased flow, and the pressure in area 93 decreases because of the momentum of the water in the sprinkler line and the reduced flow. The increase in this pressure differential normally would cause the rate of valve closing to increase, thereby enhancing the water hammer effect. However, as the present invention valve closes, the head of screw 98 first moves into bore 180 so that a substantially reduced flow area, that is, the area of the annular passageway generally indicated by the numeral 182 in FIG. 6, is presented to the flowing water. The reduced flow area stays substantially constant upon further closure of the valve until just before complete closure, whereupon the area between member 96 and valve seat 92 becomes the limiting flow area which finally reduces to zero on full closure of the valve.

This is illustrated in FIG. 7, which is a graphical representation of the flow area versus valve position for the valve of the present invention, and for a typical prior art valve. The flow area versus valve position for a prior art valve is substantially a linear function, as may be seen in line 184 in FIG. 7. It will be noted that this figure is merely a plot of area versus position, and it must be remembered that because of the increasing pressure differential across the valve, there is a tendency of the valve to accelerate as it approaches the closed position so that sudden closure and a water hammer will result.

The flow area versus valve position for the present invention valve is shown as line 186 in FIG. 7. It will be noted that as the valve closes, the flow area is reduced to a reasonably small area (the annular area 182) and remains substantially constant, or at least with a very reduced rate of decrease over a range in valve position, generally indicated by the numeral 188, until the valve is very close to complete closure, at which time the flow area reduces with closure in the normal manner. The effect of controlling area in this manner may be shown as follows: As the valve moves from the open position, the pressure on the high pressure side of the valve starts to increase. However, before the pressure reaches an excessive level, the valve reaches position 190 in FIG. 7, and thereafter, in region 188, further reduction in the valve flow area is grossly limited. Thus, in this region, though flow is not prevented, it is grossly impeded so that the kinetic energy in the water in both the supply line and in the sprinkler line may be largely dissipated by viscus effects in the reduced flow area. Consequently, when final valve closure occurs, there is very little momentum in the system to result in any detectible water hammer effect.

It should be noted also that the flow area when the valve position is in region 188 is an annular area having a considerable length, as opposed to an area more closely approaching an orifice. This is advantageous in the present system for the reason that the flow is more responsive to the differential pressure and will better tend to dissipate the kinetic energy of the flowing water. (The flow rate through a conduit having a substantial wetted area being approximately proportional to the pressure differential, whereas the flow rate through an orifice is approximately proportional to the square root of the pressure differential.) Although member 98 has a chamber 192 at the lower edge therof so as to initially define a smoother transition into the substantially constant flow area region 188 of FIG. 7, it is to be understood that the specific contour of screw 98 and thus the specific shape of curve 186 may be varied as desired to achieve the objects of this aspect of the present invention, that is, of restricting the flow to a substantially uniform flow area or at least a slowly reducing flow area over a range of valve positions adjacent to the fully closed position so as to provide a means for dissipating most of the kinetic energy in the flowing water without a required interruption in the motion of the actuating member prior to the final complete closure of the valve.

Figure 3:
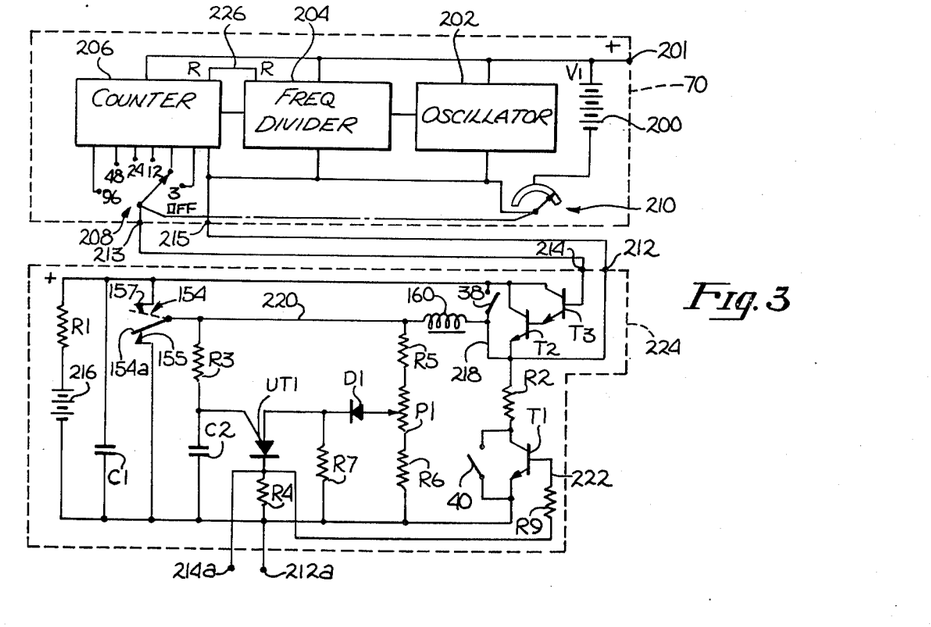
FIG. 3 is a schematic diagram of the electronic circuitry for control of the master controller of FIG. 2.

Now referring to FIG. 3, the electronics comprising the clock 70 and the electronics mounted on circuit board 68 of FIG. 4 may be seen. The clock is comprised of a replaceable power source 200 which, in the preferred embodiment, comprises two 1½ volt pen light batteries, resulting in an operating voltage to the clock circuitry of 3 volts. The power source 200 provides electrical power to oscillator 202, frequency divider 204 and counter 206. Oscillator 202 in the preferred embodiment is a crystal oscillator of the type well-known in the prior art, as described in Vacuum Tube and Semi-Conductor Electronics, by Jacob Millman, a 1958 McGraw-Hill Book Company publication, starting on page 485, and more specifically in the references cited at the end of the corresponding chapter on page 498 thereof. Such an oscillator provides a highly stable and accurate reference frequency at a relatively low cost and with a relatively low power consumption.

The frequency divider 204 is an integrated circuit comprising a series of flip flops with the input of the first flip flop being provided by oscillator 202, and the output on each flip flop providing the input to the next successive flip flop. The output of the last flip flop is coupled to counter 206. Such integrated circuits are commercially available from a number of manufacturers, and the number of flip flops used in the frequency divider 204 will depend upon the clock time intervals desired and the reference frequency of the crystal in oscillator 202. The inter-connection of flip flops to achieve frequency dividing in this manner is well-known in the prior art and is described generally starting on page 323 of Pulse and Digital Circuits, by Millman and Taub, a 1956 McGraw Hill Book Company publication. The output of the last flip flop in frequency divider 204 is coupled to counter 206, which also is comprised of a series connection of a plurality of flip flops. In the counter 206, however, the output of each flip flop is coupled to one contact of a rotary switch 208 so that any of the various contacts may be selected by the selector 46 (FIG. 1) in the master controller. In the preferred embodiment, the reference frequency of oscillator 202 and the number of countdown flip flops in frequency divider 204 and counter 206 is such that the last flip flop in the chain provides an output pulse every 96 hours. Since each flip flop provides a divide by two functions, the next to the last flip flop provides an output pulse each 48 hours etc. so that time intervals of 96, 48, 24, 12, 6 and 3 hours may be readily selected through rotary switch 208. Also mechanically coupled to interval selector 46 (FIG. 1) is a second rotary switch 210 which is adapted to maintain connection of power source 200 with the other circuit components in all positions of switch 208, except the off position. Thus, by turning switch 208 to the off position, power source 200 may be disconnected. While this may be used to turn off the time clock, its primary purpose in the preferred embodiment is in setting the clock, as shall be subsequently described.

In the master controller 20, the output of counter 206, selected through rotary switch 208, is coupled through terminals 213 and 215 to the remaining circuitry 224 in the master control unit. In this circuitry, a power source 216, which in the preferred embodiment is a 22½ volt dry cell, maintains a charge on capacitor C1 through resistor R1, this combination providing the power source required for turning on the valve in response to the signal from counter 206, and turning off the valve at some selected period thereafter.

When the valve is in the closed position as shown in FIG. 4, the permanent magnet 166 in solenoid 62 is substantially magnetically uncharged, and the return spring 16 encourages plunger 132 to the extended position, thereby closing the valve between cavity 136 and cavity 120 and maintaining the valve in this position. When in this condition, microswitch 154, physically shown in FIG. 4 and diagrammatically shown in FIG. 3, is in the position shown in FIG. 3, with the moving element 154a contacting the switch contact connected to the negative terminal of the power source. (In this condition transistor T1 and transistors T2 and T3 are all turned off.) One end of solenoid coil 160 is coupled to the moving element 154a of microswitch 154, and the other end of the solenoid coil is connected to the emitter of the NPN transistor T2, and to the collector of NPN transistor T1 through resistor R2, and is still further coupled through terminal 212 to terminal 215 of the power source 200 in clock 70. The other terminal 214 coupled to the clock terminal 213 is connected to the base of transistor T3, and when clock 70 provides an output pulse through terminal 213, transistor T3 is turned on. This in turn turns on transistor T2 (transistors T3 and T2 being connected in the well-known Darlington configuration), thereby coupling lead 218 to the positive terminal of the power supply comprising battery 216, capacitor C1 and resistor R1. Since lead 220 is coupled to the negative side of the power supply through microswitch 154, substantially the full power supply voltage is instantaneously applied to the solenoid coil 160. This magnetizes permanent magnet 166 and moves the solenoid plunger 132 toward the withdrawn position, and as it approaches the withdrawn position actuates microswitch 154 through member 166 so as to move the moving contact 154a into contact with fixed contact 157 coupled to the positive terminal of the power supply. Movement of the microswitch terminates the flow of current to the solenoid coil 160, though the permanent magnet, which is now charged, maintains the solenoid in the actuated position.

The pulse from clock 70 on line 214 is only a few milliseconds in duration, and transistors T2 and T3 are turned off at the end of a pulse (the current flow in coil 160 is turned off by movement of switch 154 since after the movement as hereinbefore described, both ends of coil 160 are coupled to the positive terminal of the power supply, even when transistors T2 and T3 remain on). Thus, when the valve is open, line 220 is at the positive power supply voltage, and within a few milliseconds after the valve opens, transistors T3 and T2 are again turned off by the drop in the pulse on line 214. At this time capacitor C2 starts to charge through resistor R3, the rate of charging being primarily dependent on the RC time constant of the resistor capacitor combination. The junction between R3 and C2 is coupled to the emitter of a unijunction UT1, with base 1 of the unijuntion transistor coupled to the negative power supply terminal through resistor R4, and base 2 of the unijuntion transistor being coupled through diode D1 and a variable voltage divider comprised of potentiometer P1 and resistors R5 and R6. When capacitor C2 charges to the voltage required for firing the unijuntion transistor, the unijunction transistor (being the solid state equivalent of a thyratron), starts conducting, thereby discharging capacitor C2 through resistor R4 and providing a pulse on line 222 to the base of transistor T1 through a current limiting resistor R9, thereby turning on the transistor for the period of time required for capacitor C2 to discharge, and providing a pulse on lead 214a coupled to base 1 of the unijunction; (e.g., a pulse with respect to lead 212a coupled to the negative terminal of the power source).

When the unijunction transistor UT1 fires, the discharge of capacitor C2 creates a voltage pulse across resistor R4 and thus, a pulse on line 222 to the base of transistor T1. This turns on transistor T1 for the duration of the pulse and couples line 218 through resistor R2 to the negative terminal of the power supply. At this time, the moving contact of switch 154 is in contact with fixed contact 157 and thus, line 220 is connected to the positive power supply terminal. Thus, solenoid coil 160 is again excited, this time with a reverse polarity from that discribed hereabove, and with a current limiting means, namely resistor R2, in series therewith. The resistor R2 is selected so that the current through coil 160 effectively demagnetizes permanent magnet 166 in the solenoid, thus allowing the return spring 169 to force solenoid plunger 132 to the extended position, causing the valve to close and the actuation of the microswitch 154 so as to move the moving contact 154a into contact with fixed contact 155 coupled to the negative power supply terminal. This turns off the current in solenoid coil 160, since both leads thereof are coupled to the negative terminal and within a few milliseconds thereof, capacitor C2 is discharged and the unijunction UT1 turns off, thereby removing the pulse from the base of transistor T1 and turning off that transistor. In this condition, the valve is closed and the valve actuating circuit is poised to sense a subsequent pulse from clock 70.

Capacitor C1 functions as an electrical energy storage device, and upon actuation of the circuitry, may deliver an instantaneous current to the solenoid coil 160 which exceeds the current capability of the power source 216. Diode D1 and resistor R7 are for temperature compensation purposes to stabilize the firing point of the unijunction transistor over the normally encountered temperature range. Potentiometer P1 is mechanically accessible as control 44, as may be seen in FIG. 1, and is used to vary the voltage across the unijunction transistor so as to adjust the extent of charging of capacitor C2 which is required for firing the unijunction, thereby adjusting the time duration between valve turn on and subsequent automatic valve turn off. Also provided in the circuit are pushbutton switches 38 and 40 (see also FIG. 1) which may be used to manually turn on and turn off the valve independent of the clock operation. Pushbutton switch 38 provides the manually actuated equivalent of the turning on of transistors T3 and T2 by the clock so as to open the valve, with pushbutton 40 providing the manual equivalent of turning on transistor T1 by the firing of the unijunction transistor to turn off the valve.

Terminals 214a and 212a are accessible through the bottom of enclosure 34, and it will be noted that a pulse appears therebetween when the valve solenoid in the master controller receives a turn off signal. In each of the slave controllers, such as controllers 22 and 24 in FIG. 1, there is located circuitry within the outline generally indicated by the numeral 224. By connecting terminals 212a and 214a of the master controller to terminals 212 and 214 of the next slave controller, the valve in that slave controller may be commanded to open upon the closure of the valve in the master controller. Similarly, the terminals 212a and 214a on the first slave controller may be connected to terminals 212 and 214 of the second slave controller, etc. so that as the valve in one controller is commanded to close, the valve in the next controller in the series will be commanded to open, with the number of slave controllers connectable in this manner being substantially unlimited.

The control 44 on each of the controllers is calibrated and may readily be used to control the position of the wiper on potentiometer P1 to select the desired duration of valve opening. To set the clock 70 in the master controller 20, all the flip flops in the frequency divider 204 and counter 206 are reset at the beginning of the time interval. This may be achieved by applying a pulse to the reset line 226 by a pushbutton switch, not shown, coupled between the reset line and the positive terminal of the power source 200. In the preferred embodiment, the frequency divider 204 and counter 206 are adapted to automatically assume the reset position when power is first applied thereto, so that they may be reset to zero at any time merely by turning rotary switch 208, and particularly switch 210 mechanically coupled thereto, to the off position and then to the desired time interval by the interval control 46.

By way of specific example, assume it is desired to water once a day at 7 in the evening, the clock may be readily set by turning the interval control 46 from the off position to the 24 hour position at 7:00 o'clock the first evening and adjusting the control 44 for the desired watering period. Thus, after each subsequent 24 hour period, valve will automatically turn on for the desired period, and subsequently automatically turn off. To initiate the valve for operation of the first evening, the pushbutton switch 38 may be actuated, at which time the valve will open and subsequently automatically close after the desired interval; (in the preferred embodiment, water intervals ranging from 5 minutes to 1 hour are selectable). If it is later desired to water at more frequent intervals or less frequent intervals, the interval control 46 may be changed accordingly, with 7:00 o'clock in the evening representing the time reference for each such interval, provided interval control 46 is not subsequently moved to the off position at any time. To change the base period from 7:00 o'clock, say to 9:00 o'clock in the evening, the interval control is simply turned to the off position at 9:00 o'clock and returned to the position to select the desired interval.

The embodiment of the present invention hereinbefore described is particularly suited for replacement of the valve portion of a prior art antisiphon valve so as to easily and inexpensively convert the manually operated prior art valve to an automatically operating sprinkler system. Such a configuration allows conversion of existing sprinkler systems to automatic operation at a minimum expense, and further requires essentially no plumbing work other than the turning off of the water supply for a few moments while the valve member is replaced with the valve system of the present invention.

Figures 8, 9:
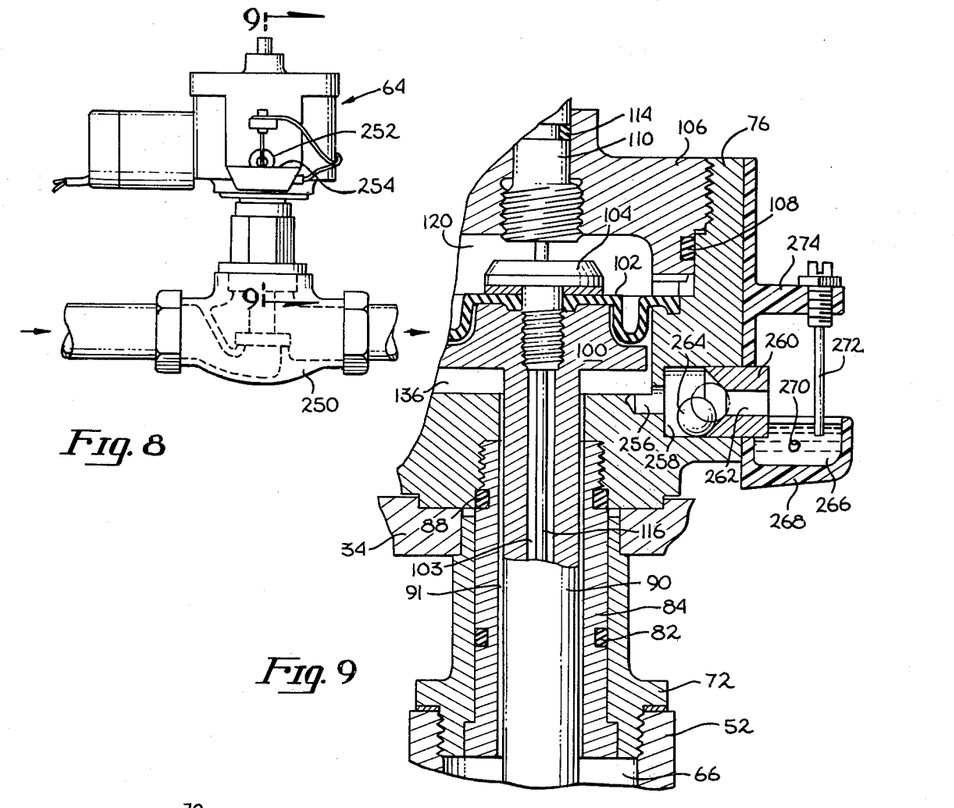
FIG. 8 is a side view of an alternate embodiment of the present invention incorporating a water sensor and anti-siphon valve.
FIG. 9 is a partial cross-section of the valve of FIG. 8.

As an alternate embodiment, the basic assembly described in detail with respect to FIGS. 4, 5 and 6 may be adapted and used in conjunction with a separate valve body such as valve body 250 shown in FIG. 8. In this figure, which shows solenoid 62 and body 64 with the enclosures removed therefrom, there may also be seen an anti-siphon valve, generally located in the area indicated by the numeral 252, and a moisture sensing apparatus generally indicated by the numeral 254. These features are illustrated in greater detail in FIG. 9, which is a cross-section of body 64 taken along lines 9—9 of FIG. 8. The anti-siphon valve is comprised of a horizontally disposed passage 256 with cavity 136 and a cylindrical opening 258 through the side of the valve body. A cylindrical member 260 having a hole 262 therethrough and an inward facing tapered surface is located at the outer end of cylindrical opening 258 so as to partially close off the opening. A ball 264, preferably of a material substantially denser than water such as in the preferred embodiment, brass, is located between opening 256 and cylindrical member 260 so as to be normally disposed as shown in the figure, but movable as a result of water flow from cavity 136 outward through opening 262 to seal off the opening and prevent further water flow so long as a substantial differential pressure exists so as to hold the ball in position (as shown in phantom).

A reservoir 266 is defined by an outward and upward projecting member 268 integral with the valve body. A first electrode 270 is permanently located adjacent the bottom of reservoir 266, and a second electrode 272 is threadedly supported by a member 274 so as to be threadedly adjustable in its relative vertical disposition with respect to the reservoir to dispose the lower end of electrode 272 a desired distance below the top of reservoir 266.

Figure 10:
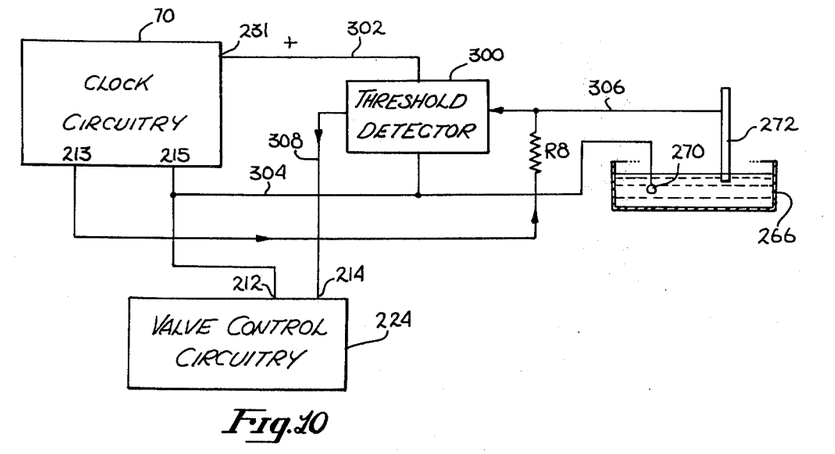
FIG. 10 is a schematic diagram showing the interconnection of the water sensor with the electronic components of FIG. 3.

Now referring to FIG. 10, a diagram of the circuitry and inter-connection for the electrodes in the reservoir 266 may be seen. This embodiment uses the same clock circuitry 70 and the same valve control circuitry 224 as shown and described with respect to FIG. 3, and consequently such circuitry is only shown in block diagram form in FIG. 10. However, interposed between the output terminal 213 of the clock circuitry and the input terminal 214 of the valve control circuitry is the circuitry comprising the moisture sensor. As before, terminal 215 of the clock circuitry is connected directly into terminal 212 of the valve control circuitry and provides the common or ground connection for these two circuits. When the clock circuitry provides an output pulse on terminal 213, this pulse is coupled to the input of a threshhold detector 300 through resistor R8. The threshhold detector is characterized by a high input impedance and provides a positive output voltage of relatively low impedance whenever the input is above the threshhold level. The threshhold detector 300 is connected through lines 302 and 304 to terminals 201 and 215 of the clock circuit respectively (FIGS. 3 and 10). Thus, the threshhold detector is powered by the power source 200 in the clock circuitry and is turned on and off with the clock circuitry in accordance with the position of switch 210. Suitable threshhold detectors are well-known in the prior art and need not be shown in further detail herein. In the preferred embodiment, an integrated circuit threshhold detector is used, specifically an integrated circuit manufactured by General Electric and identified in the manufacturers literature as the PA-1494 Precision Threshhold Detector with Hysteresis. Electrode 270 is also coupled through line 304 to terminal 215 of the clock circuit, and the adjustable electrode 272 is coupled through line 306 to the input to the threshhold detector.

Resistor R8 in the preferred embodiment has a resistance on the order of 10 megohms. Thus, when there is no water in the reservoir 266, electrodes 270 and 272 are electrically isolated from each other so that an output pulse on terminal 213 of the clock may trigger the threshhold detector 300 and cause an output pulse on line 308 connected to terminal 214 so as to turn on the valve. However, if there is water in reservoir 266 of a depth at least sufficient to contact both terminals 270 and 272, the conductivity of the water will provide a resistance substantially lower than that of resistor R8, and since terminal 270 is connected to the ground terminal 215 through line 304, the input to the threshhold detector will be effectively shorted out through the water in the reservoir. Thus, the voltage appearing on line 306 and on the input to the threshhold detector 300 will be less than that required to trigger the threshhold detector and as a result no pulse will be applied to terminal 214 of the valve control circuitry to turn on the valve. Thus, it may be seen that the lower limit of resistance of resistor R8 is established by the fact that it must be large compared to the conductivity of the water normally collected in the reservoir 266 so that the voltage divider formed by resistor R8 and the resistance of the water in the reservoir 266 will divide down a voltage pulse generated by the clock circuitry 70 to a voltage less than the trigger voltage for the threshhold detector 300. As an upper limit to the resistance, the resistor R8 must not be so large as to fail to provide a sufficient input current to the threshhold detector 300 to trigger it when the reservoir is dry, and particularly in the presence of slight leakage resistances between electrodes 270 and 272 caused by a partially conductive film of foreign matter which may collect on the plastic surfaces coupling the two electrodes.

It may be seen from the above description that when the water level in reservoir 266 is at least sufficiently high to contact the two electrodes 270 and 272, a pulse generated by the clock circuitry will not be coupled to the valve control circuitry so that the valve will not be operated thereby, whereas if reservoir 266 is empty or substantially empty, such a clock pulse will be coupled to the valve control circuitry and will cause the valve to operate in the hereinbefore described manner. Reservoir 266 is disposed on this embodiment so as to freely capture rain water, and as hereinbefore indicated, will in general be filled by the initial leakage from the antisiphon valve of this embodiment. Consequently, this water must evaporate and the reservoir not be refilled with rain water before a subsequent clock pulse may operate the system. In the event of very humid weather when watering on a frequent interval is not required, the reservoir 266 will remain filled with water for a considerable time, emptying only at a rate consistent with the rate of moisture evaporation from the surrounding ground and, thus, determinative of the needs of the ground for additional water. Also, if the reservoir dries but is refilled to a sufficient level by a subsequent rain which, of course, will also satisfy the needs of the surrounding ground for additional water, the watering system will not operate until this new water evaporates.

In the foregoing disclosure, the present invention has been described in detail with respect to watering systems. However, the present invention is readily applicable to other fluid flow control applications, such as, by way of example, toilets. Thus, in FIGS. 11 through 16, embodiments of the present invention adapted for use with an ordinary toilet may be seen. In these embodiments, the water tank commonly found above and behind toilets, as used in residential applications, is eliminated, and the valve of the present invention is coupled directly to the toilet and to the water supply system so as to control the direct flow of water into the toilet for flushing purposes. Consequently, the expensive and unsightly water tank is eliminated through the use of the present invention.

Figure 11:
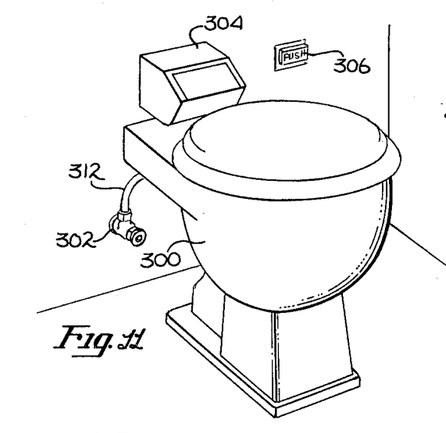
FIG. 11 is a perspective view of a toilet using the water control system of the present invention.
Figures 12, 15:
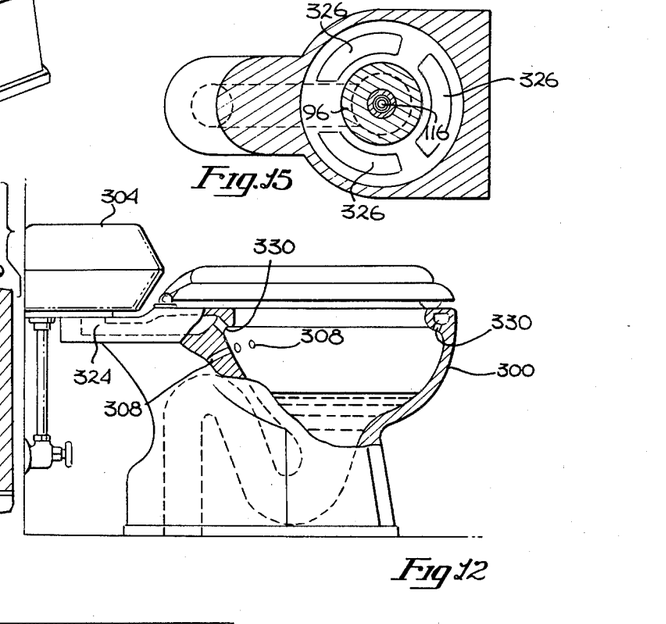
FIG. 12 is a side view of FIG. 11 taken in partial cross section.
FIG. 15 is a cross section of the valve of FIG. 14 taken along lines 15—15 of that Figure.

As shown in FIG. 11, a conventional toilet bowl 300 is coupled to the water supply system 302 through a water control system in accordance with the present invention, generally housed within enclosure 304. A push button switch 306 is disposed in any convenient location such as on a wall adjacent or behind the toilet or on the enclosure 304 for the water control system. A side view of the toilet and water control system of FIG. 11 may be seen in FIG. 12. This view, shown in parallel cross section, illustrates some of the functional details of the toilet and the connection thereof to the water control system. In this embodiment, the toilet bowl 300 is provided with a plurality of holes 308 through the bowl, generally toward the rear thereof, which communicate with the outside of the bowl. These holes are located generally above the normal water level in the bowl, even while flushing, and in the ordinary course of events are not called into play. However, in the event of a drain stoppage which would normally result in the overflow of the toilet, the maximum water level is limited by the plurality of holes 308 to the level of these holes on the inner surface of the toilet bowl. Thus, the holes 308 serve to limit the maximum level of the water in the toilet bowl to a level somewhat lower than in prior art toilet bowls, and though they drain inordinately high water out onto the surrounding floor, they do so only in those instances where overflow over the top of the toilet bowl would be forthcoming in any event.

Figure 14:
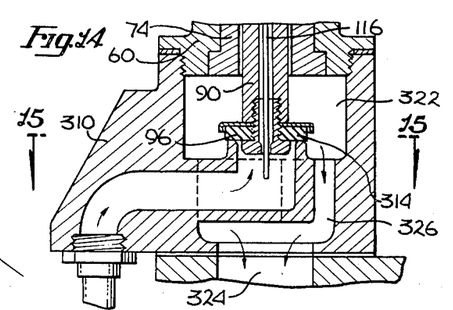
FIG. 14 is a cross section of the valve used with the toilet system shown in FIG. 11.

Now referring to FIG. 14, a cross section taken along lines 14—14 of FIG. 11, with the cover 304 removed therefrom, may be seen. This cross section (showing only part of the valve, since the remainder of the valve is identical to the embodiment heretofore described in detail with respect to FIGS. 4, 5 and 6) shows the valve body 310 coupled to the high pressure water supply line 312. Valve body 310 has a valve seat 314 which is engageable with the complient member 96 on the lower end of actuating member 90.

Threaded into the valve body 310 is member 60, and concentric therewith is member 74. These members are only partially illustrated, and the remainder of the valve solenoid, diaphragm, etc., located above valve body 310 are not shown since they are the same as those described in detail hereinbefore.

Surrounding the lower end of actuating member 90 is a cavity 322 in communication with the water entrance port 324 coupled to the toilet bowl. This communication is established through passages 326 which may be seen in both FIGS. 14 and 15 (FIG. 15 being a cross section taken along lines 15—15 of FIG. 14 to better illustrate the passages).

Figure 16:
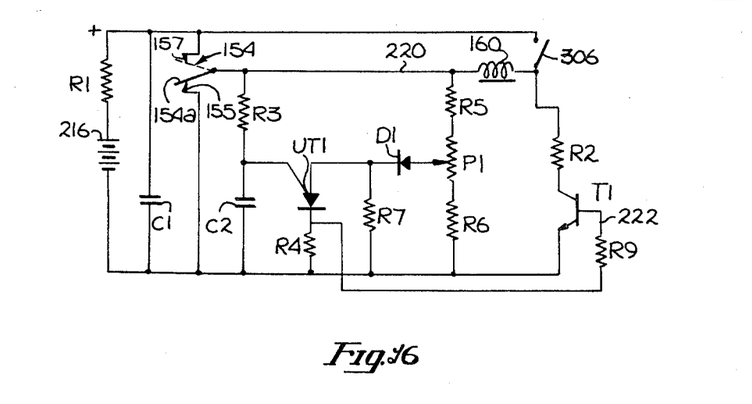
FIG. 16 is a schematic diagram of the electronic control of the valve used with the toilet system of FIG. 11.

Thus, in the embodiment hereabove described, a push button switch 306 is used to open the valve, and after a predetermined flushing time, the valve is automatically closed. The circuitry for use of the water control system of this embodiment is shown in FIG. 16 and is substantially the same as that previously shown and described with respect to FIG. 3. Thus, the components identified in FIG. 16 with the same numeral as used in FIG. 3 have the same function and operation as heretofore described with respect to FIG. 3, the primary difference in the two circuits being that transistors T2 and T3 have been eliminated and the push button switch 306 (identical in function to switch 38) is used to initially open the valve. Similarly push button switch 40 for closing the valve is eliminated since manual closure is generally not required. (It should be noted that two distinctly different flushing durations may be used if desired to conserve water by providing two push button switches, e.g., a short flush switch and a long flush switch, in place of switch 306, and further mechanically coupling such switches to one or more additional switches to effectively switch in either of two values of one of the components which determines the time delay of a time delay circuit, such as, capacitor C2 or one or more of resistors R3, R5 and R6.)

In the above described embodiment, if the water pressure in the water supply line 312 drops, the actuating member 90 will close the valve. (An appropriately placed coil spring may be used to assure such closure upon loss of water pressure if desired). At the same time, any water which may have been flowing into cavity 322 from line 312 to flush the toilet will drain out through connection 324 into the toilet bowl, and air will be allowed to fill the cavity 322 since the water level in the bowl is normally well below the flushing outlet 330, and in any event is limited to a level below the flushing outlets by the holes 308 through the toilet bowl. Thus, the anti-siphon function of the valve is achieved without substantial complexity, and without requiring the placement of a valve or other mechanism substantially higher than the toilet bowl.

Figure 13:
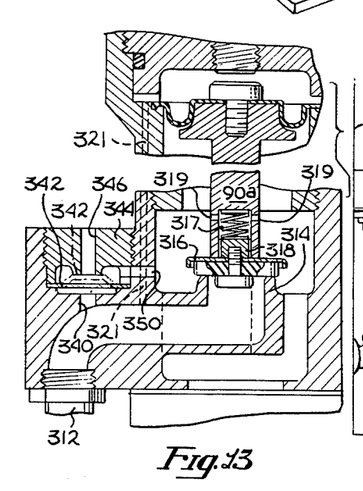
FIG. 13 is a cross-sectional view of an alternate embodiment of a valve usable for water flow control in a toilet.

An alternate embodiment of the valve for use in a toilet flushing system is shown in FIG. 13, which is a cross section of the alternate embodiment equivalent to the cross section of FIG. 14. In this embodiment, the valve body 310a is similar in design and function to the valve body 310 previously described. The valve body 310a has a valve seat 314 which is engageable with a valve closure assembly 316 slideably fitting within the actuating member 90a (the closure member assembly 316 is comprised of members 94, 96 and 98 hereinbefore described, with member 98 threadably assembled into a cylindrical member 318 slideably fitting within a cylindrical opening 320 at the lower end of actuating member 90a). Thus, when the actuating member 90a is in the valve closed position, the valve closure assembly will be forced downward against the seat 314 and the valve will be forced closed. When the actuating member 90a is in the upward or valve open position and high pressure water is supplied through line 312, the pressure of the water will force the valve closure assembly 316 upward away from valve seat 314 and against actuating member 90a, thereby opening the valve. However, should water pressure be lost from the water supply line 312 while the valve actuating member 90a is in the upward position, the valve closure assembly 316 will move downward by the force of gravity to close the valve, thereby performing at least part of the anti-siphon valve function. In this regard, a spring 317 disposed between actuating member 90a and the cylindrical member 318 will assure closure of the valve as the water pressure in line 312 begins to drop so that the valve is forceably closed before any referse flow may take place. Responsive motion of the valve closure assembly 316 is further assured by vent holes 319 which relieve the pressure or vacuum on the top of member 318.

It is to be noted that in this particular embodiment the passageway 103 through the actuating member 90 (FIG. 4, for example) has been eliminated. Thus, a new passageway must be provided between the inlet line 312 and cavity 120 at the top of diaphragm 102. To achieve this communication, separate passageway 321 is provided.

In this embodiment, the valve body 310a further has a port 340 communicating with the lower side of a flexible diaphragm 3442 and with the tubulation connecting to the high pressure 342 line 312. The flexible diaphragm 342 is disposed below and retained in position by member 344, threadably engaging a mating cavity in valve body 310a, which defines a port 346 communicating with the atmosphere and terminating in a valve seat surface 348. Also communicating with the space above the top surface of a flexible diaphragm 342 and with cavity 322 in the valve body 310a is an additional port 350. Thus, when high pressure water is delivered to the valve body through pipe 312, pressure is communicated through port 340 to the lower surface of the flexible diaphragm 342, forcing the diaphragm upward against the valve seat 348 in member 344. This prevents communication between port 350 and port 346 and prevents backflow of water from cavity 322 outward through port 346. However, in the event the water pressure drops in line 312 the elastic characteristic of flexible diaphragm 342 will pull it back to the undeflected position, thereby putting port 346 in communication with cavity 322 through port 350 and providing air to the back surface of the valve closure assembly 316. Consequently, in this embodiment, when water pressure is lost in the water supply system, the valves will close and air will automatically be supplied to cavity 322 to drain the water therefrom. Thus, the anti-siphon function is achieved without requiring a limitation of the water level in the toilet bowl 300 to a level below openings 330, provided, however, that the water is at least below the valve seat surface 314 in valve body 310a, a condition which is very easily met by design.

There has been described herein a fluid control system having a variety of uses. Described in detail herein are systems adapted for use in watering systems and in toilets. These systems being representative of fluid control systems in general of the intermittent operation type, either manually or electronically initiated, and which may be of the type requiring the incorporation of an anti-siphon capability. Of course, the fluid control system described herein may readily be adapted to other applications and used with other fluids. In that regard, the use of plastics and synthetic rubber-like materials throughout the portions of the fluid control system actually exposed to the fluids allows the use of the fluid control system of the present invention with fluids having corrosive, inflammable or other special and/or hazardous characteristics. Thus, while the invention has been particularly shown and described with reference to preferred embodiments thereof, it will be understood by those skilled in the art that various changes in form and details may be made therein without departing from the spirit and scope of the invention.

We claim:
1. A fluid control system comprising:

a plurality of solenoid actuated valves each responsive to a first electrical pulse to open the respective valve and a second electrical pulse to close the respective valve; each of said valves including electronic time delay means for providing said second electrical pulse to close the respective valve a predetermined length of time after said first electrical pulse opens said respective valve;

means for providing a first electrical pulse to open the first of said solenoid actuated valves, said solenoid activated valves being arranged in series; and means for coupling said electronic time delay means of each said solenoid actuated valves to the next of said solenoid activated valves so that said second electrical pulse of one of said time delay means further provides said first electrical pulse to the next of said solenoid actuated valves.

2. The fluid control system of claim 1 further comprised of clock means in said first of said solenoid actuated valves for providing an output signal at predetermined intervals to provide said first electrical pulse thereto.

3. A plurality of solenoid operated valves for use with valve bodies of the type having an annular valve seat and first and second ports communicating with opposite sides of the flow passage through said valve seat, each of said solenoid valves comprising:

a valve member linearly moveable, when mounted on a valve body of the type stated, between an open position whereby fluid may flow from said first port through said valve body to said second port, to a closed position whereby said valve member rests on said valve seat in opposition to the pressure of the fluid communicated from said first port to prevent fluid flow from said first port to said second port through said valve body;

a pressure responsive means coupled to said valve member and responsive to a fluid pressure on a first side thereof to force said valve member to said closed position and responsive to a fluid pressure on a second side thereof to force said valve member to said open position, said first side of said pressure responsive means being in communication with fluid being received under pressure from said first port, said second side of said pressure responsive means being in communication with fluid deliverable through said second port;

second valve means interposed in a fluid passageway communicating with said first and second sides of said pressure responsive means, said second valve means including a second valve member moveable between a closed position preventing fluid flow and an open position allowing fluid flow;

a solenoid having at least one solenoid coil and having a stationary member and moving member at least in part defining a magnetic circuit, said moving member being coupled to said valve means and moveable with respect to said stationary member between a first position having a minimum nonmagnetic gap in said magnetic circuit to a second position having a substantial non-magnetic gap, said solenoid being responsive to a first current pulse in a solenoid coil to magnetize said magnetic circuit in said solenoid and move and retain said valve means to one of said open and closed positions, and responsive to a second current pulse in a solenoid coil to change the level of magnetization to a second level to allow the movement of said valve means to the other of said open and closed positions;

a first switch means mechanically coupled to said moving member for actuation thereby, said switch means having first and second terminals;

electronic power source means;

electronic time delay means for creating a time delay signal, said first terminal of said first switch means being coupled to one terminal of said electronic power source means, said electronic time delay means being coupled between said second terminal of said first switch means and a second terminal of said electronic power source, said electronic time delay means being a means for providing a time delay output signal a predetermined length of time after actuation of said first switch means;

a second switch means, said second switch means being an electronic switch coupled to said electrical power source and in series with a solenoid coil and responsive to an actuation signal, said second switch means being a means for coupling a solenoid coil to said electrical power source upon receipt of a first electrical signal, to provide said first current pulse thereto;

a third switch means, said third switch means being an electronic switch coupled to said electrical power source and in series with a solenoid coil and responsive to a said time delay signal from said electronic time delay means, said second switch means being a means for coupling a solenoid coil to said electrical power source upon receipt of a second electrical signal from said time delay means to provide said second current pulse thereto;

said electronic time delay means of each except the last one of said plurality of solenoid valves is coupled to said second switch means of the next of said plurality of said solenoid valves so that said time delay output signal of said time delay means of a responsive said solenoid valve actuates said second switch means of the next said solenoid valve.

4. A fluid control system comprising:

a plurality of solenoid actuated valves each responsive to a first electrical signal to open the respective valve and a second electrical signal to close the respective valve; each of said valves including time delay means for providing said second electrical signal to close the respective valve is predetermined length of time after said first electrical signal opens said respective valve;

means for providing a first electrical signal to open the first of said solenoid actuated valves, sai solenoid activated valves being arranged in series; and means for coupling said time delay means of each said solenoid actuated valves to the next of said solenoid activated valves so that said second electrical signal of one of said time delay means further provides said first electrical signal to the next of said solenoid actuated valves.

5. The fluid control system of claim 4 further comprised of clock means coupled to said first of said solenoid actuated valves for providing an output signal at predetermined intervals to provide said first electrical signal thereto.

* * * * *